(12) United States Patent
Rainville (10) Patent No.: US 7,645,000 B2
(45) Date of Patent: Jan. 12, 2010

(54) BRAKING SYSTEM FOR MOBILE STORAGE UNIT

(75) Inventor: Serge Rainville, Charlesbourg (CA)

(73) Assignee: Montel Inc., Montmagny, Quebec (CA)

( * ) Notice: Subject to any disclaimer, the term of this patent is extended or adjusted under 35 U.S.C. 154(b) by 663 days.

(21) Appl. No.: 11/411,786

(22) Filed: Apr. 27, 2006

(65) Prior Publication Data

US 2007/0252491 A1 Nov. 1, 2007

(51) Int. Cl.
*A47B 53/00* (2006.01)
(52) U.S. Cl. .................................... 312/201
(58) Field of Classification Search ................ 312/198, 312/200, 201, 199, 319.1, 319.2; 188/31; 104/178
See application file for complete search history.

(56) References Cited

U.S. PATENT DOCUMENTS

| | | | |
|---|---|---|---|
| 3,944,309 A | | 3/1976 | Taniwaki |
| 4,138,173 A | | 2/1979 | Taniwaki |
| 4,153,312 A | * | 5/1979 | Taniwaki ..................... 312/198 |
| 4,607,896 A | | 8/1986 | Peterman |
| 4,616,888 A | | 10/1986 | Peterman |
| 4,616,889 A | * | 10/1986 | Peterman ..................... 312/201 |
| 4,743,078 A | * | 5/1988 | Dahnert ....................... 312/201 |
| 4,783,618 A | * | 11/1988 | Artrip ........................... 318/587 |
| 5,005,923 A | * | 4/1991 | Dahnert ....................... 312/201 |
| 5,160,189 A | * | 11/1992 | Johnston et al. ............. 312/201 |
| 5,360,262 A | | 11/1994 | Davidian |
| 5,401,090 A | | 3/1995 | Muth et al. |
| 5,417,486 A | | 5/1995 | Manlove |
| 5,669,682 A | * | 9/1997 | Janson ......................... 312/201 |
| 6,595,332 B1 | | 7/2003 | Pennington |

* cited by examiner

*Primary Examiner*—James O Hansen
(74) *Attorney, Agent, or Firm*—Louis Martineau (57) ABSTRACT

A driving mechanism having a braking system, for use on a storage unit movable about guiding tracks, The driving mechanism comprises a frame rotatably carrying at least one driving wheel, which in turn rollably engages a floor-embedded guiding track, A toothed wheel rotatably carried by the frame is operatively connected to the driving wheel and rotates in synchronism therewith, and defines at least one first interlock member, The driving mechanism also comprises a gravity-biased second braking member defining at least one second interlock member, said second braking member movably mounted to the frame so as to be movable between a standby position in which the second interlock member clears the first interlock member, and a braking position in which the second interlock member is interlocked with the first interlock member to block rotation of the rotary first braking member and thus of the driving wheel, The second braking member is biased under the action of gravity towards the braking position when it is in its standby position, The driving mechanism further comprises a brake control member mounted to the frame, the brake control member being movable between a retaining position in which the brake control member engages and retains the second braking member in its standby position against the bias of gravity, and a release position in which it clears the second braking member to allow gravity-borne movement of the second braking member towards the braking position. The second braking member is free of any mechanical structural link with the brake control member.

9 Claims, 6 Drawing Sheets

BRAKING SYSTEM FOR MOBILE STORAGE UNIT

FIELD OF THE INVENTION

The present invention relates to mobile storage systems, and more particularly to a braking system for mobile storage units.

BACKGROUND OF THE INVENTION

Mobile storage systems are widely used in libraries or other storage facilities to maximise storage space. Mobile storage systems generally consist of a number of upright mobile storage units including shelves, which can be moved independently along floor-embedded tracks to which they are each independently operatively connected. The storage units can be moved longitudinally along the rails, and aisles can be created between two consecutive spaced-apart storage units to enable a person to access the content of the storage units located on either side of the aisle. Movement of the storage units is accomplished for example by rotating a handle located at one extremity of the storage unit, outwardly of the aisle formed between two storage units. The handle is operatively connected to and can induce rotation of a driving shaft, which in turn is operatively coupled to a number of driving wheels engaged in the floor-embedded tracks. When the handle is rotated, the driving wheels are also rotated, and the storage unit is set in motion along the tracks.

A person located within an aisle cannot readily access the handle to stop the movement of the storage unit. Safety considerations thus make it highly desirable to provide each storage unit with a braking system which can be quickly accessed by a person located within an aisle between two storage units. Indeed, each storage unit, once loaded with articles, generally has a considerable weight (e.g. thousands of kilograms). Once set in motion along the tracks, the loaded storage unit could crush a person against an adjacent storage unit if this person stands in the aisle. Thus, if a person standing in an aisle finds that one (or both) of the storage units on either side of the aisle is moving dangerously towards him, he can trigger the braking system to instantly interrupt the displacement of the corresponding storage unit against him which might otherwise result in him getting crushed between the two adjacent storage units.

SUMMARY OF THE INVENTION

The present invention relates to a driving mechanism for use on a storage unit movable about a floor surface, said driving mechanism comprising:
  a frame;
  at least one driving wheel for engaging the floor surface, said driving wheel rotatably carried by said frame;
  a rotary first braking member rotatably carried by said frame and operatively connected to said driving wheel so as to rotate in synchronism therewith, said first braking rotary member defining at least one first interlock member;
  a gravity-biased second braking member defining at least one second interlock member and movably mounted to said frame so as to be movable between a standby position in which said second interlock member clears said first interlock member, and a braking position in which said second interlock member is interlocked with said first interlock member to block rotation of said rotary first braking member and thus of said driving wheel, said second braking member being biased under the action of gravity towards said braking position when it is in said standby position;
  a brake control member mounted to said frame, said brake control member movable between:
    a retaining position in which said brake control member engages and retains said second braking member in its said standby position against the bias of gravity, and
    a release position in which it releases said second braking member to allow gravity-borne movement of said second braking member towards said braking position;

wherein said second braking member is free of any mechanical structural link with said brake control member.

In one embodiment, said second braking member is pivotable relative to said frame about a pivot axis between said standby and braking positions, and defines a center of gravity horizontally offset relative to said pivot axis in said standby position.

In one embodiment, said first braking member is mounted on a shaft rotatably mounted to said frame.

In one embodiment, said driving mechanism further comprises a rotatable handle, said handle being operatively connected to said shaft for synchronised rotation therewith.

In one embodiment, said shaft comprises a number of shaft portions coextensively connected by torsion-absorbing coupling members.

In one embodiment, said first braking member is a toothed wheel mounted to said shaft and rotating as one therewith, said toothed wheel comprising a number of radially-oriented peripherally spaced-apart teeth, with a gap being formed between each two consecutive teeth, said teeth and said gaps forming said first interlock members.

In one embodiment, said second braking member is a braking block pivotally mounted to said frame adjacently to said toothed wheel, said braking block defining a free outer end forming said second interlock member. When said brake control member is moved to said release position, said braking block is forced towards said braking position under the action of gravity whereby said braking block free outer end comes into gravity-borne interlocking engagement in one of said gaps formed between two consecutive ones of said toothed wheel teeth.

In one embodiment, said braking block is L-shaped and is pivotally attached to said frame at an inner end located opposite said free outer end.

In one embodiment, said brake control member is a linkage assembly carried by said frame and comprising a connecting rod defining a distal end destined to project outwardly of the storage unit, and a proximal end pivotally connected to a retaining member, said retaining member being in turn pivotally carried by said frame. Said connecting rod can be axially moved between a first position and a second position relative to said frame, the axial movement of said connecting rod controlling the pivotal movement of said retaining member. When said connecting rod is in said first position, said retaining member engages said braking block and retains it in said standby position against the action of gravity, and when said connecting rod is moved to said second position, said retaining member is pivoted away from and clears said braking block to allow gravity-borne interlocking engagement thereof with said toothed wheel.

In one embodiment, said linkage assembly further comprises a spring member continuously biasing said connecting rod towards said first position.

In one embodiment, said driving mechanism further comprises a floor-level kick plate pivotally mounted to said frame and resting freely against said connecting rod distal end.

The present invention also relates to a mobile storage unit movable about a floor surface, comprising:

a bodywork;
a driving mechanism for moving said storage unit about the floor surface, said driving mechanism comprising:
   a frame mounted to said bodywork;
   at least one driving wheel for engaging the floor surface, said driving wheel rotatably carried by said frame;
   a rotary first braking member rotatably carried by said frame and operatively connected to said driving wheel so as to rotate in synchronism therewith, said rotary first braking member defining at least one first interlock member;
   a gravity-biased second braking member defining at least one second interlock member and movably mounted to said frame so as to be movable between a standby position in which said second interlock member clears said first interlock member, and a braking position in which said second interlock member is interlocked with said first interlock member to block rotation of said rotary first braking member and thus of said driving wheel, said second braking member being biased under the action of gravity towards said braking position when it is in said standby position;
   a brake control member mounted to said frame, said brake control member movable between:
      a retaining position in which said brake control member engages and retains said second braking member in its said standby position against the bias of gravity, and
      a release position in which it releases said second braking member to allow gravity-borne movement of said second braking member towards said braking position;

wherein said second braking member is free of any mechanical structural link with said brake control member.

DETAILED DESCRIPTION OF THE EMBODIMENTS

Figure 1:
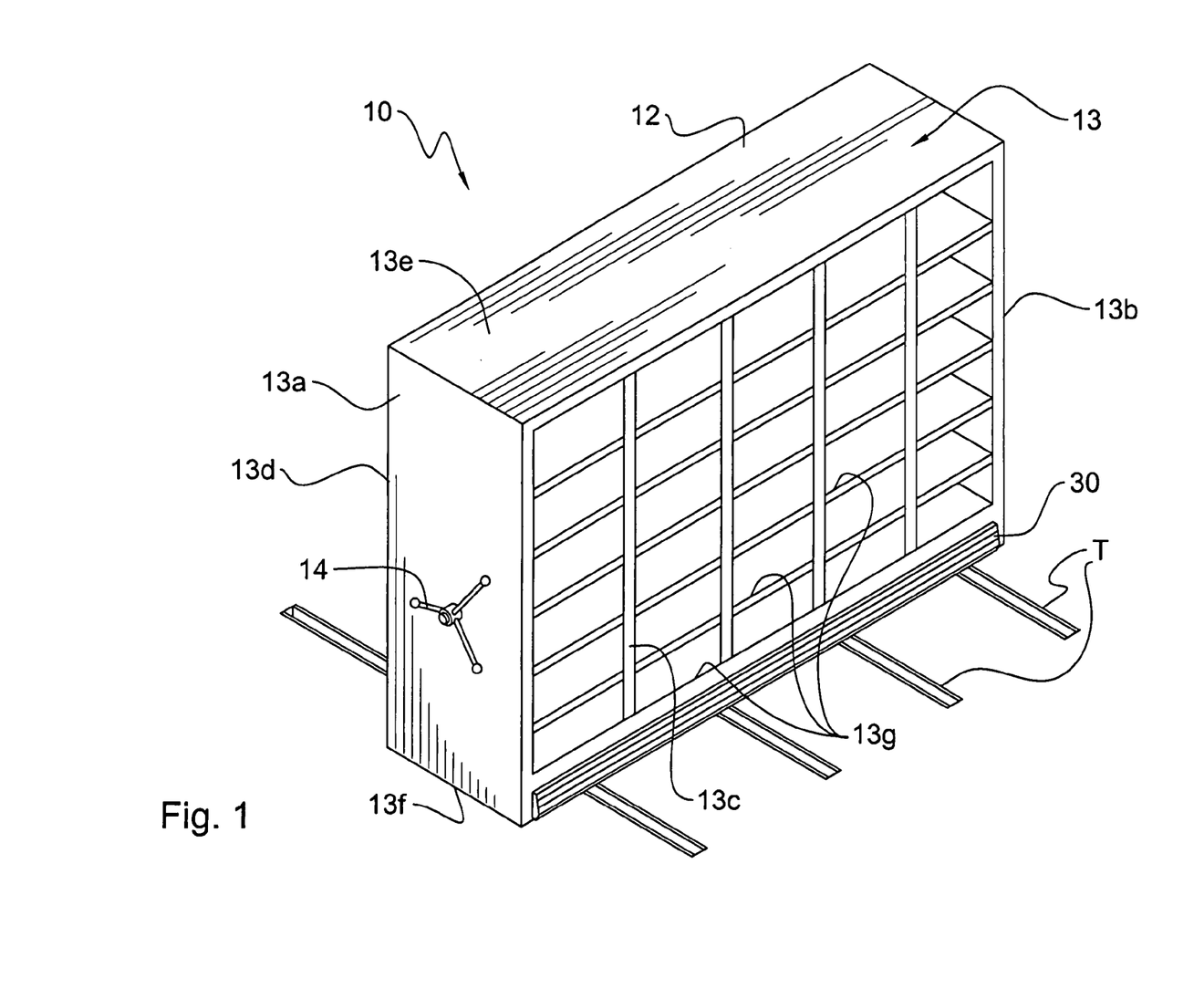
FIG. 1 is a perspective view of a mobile storage unit mounted on floor-embedded tracks.
Figure 2:
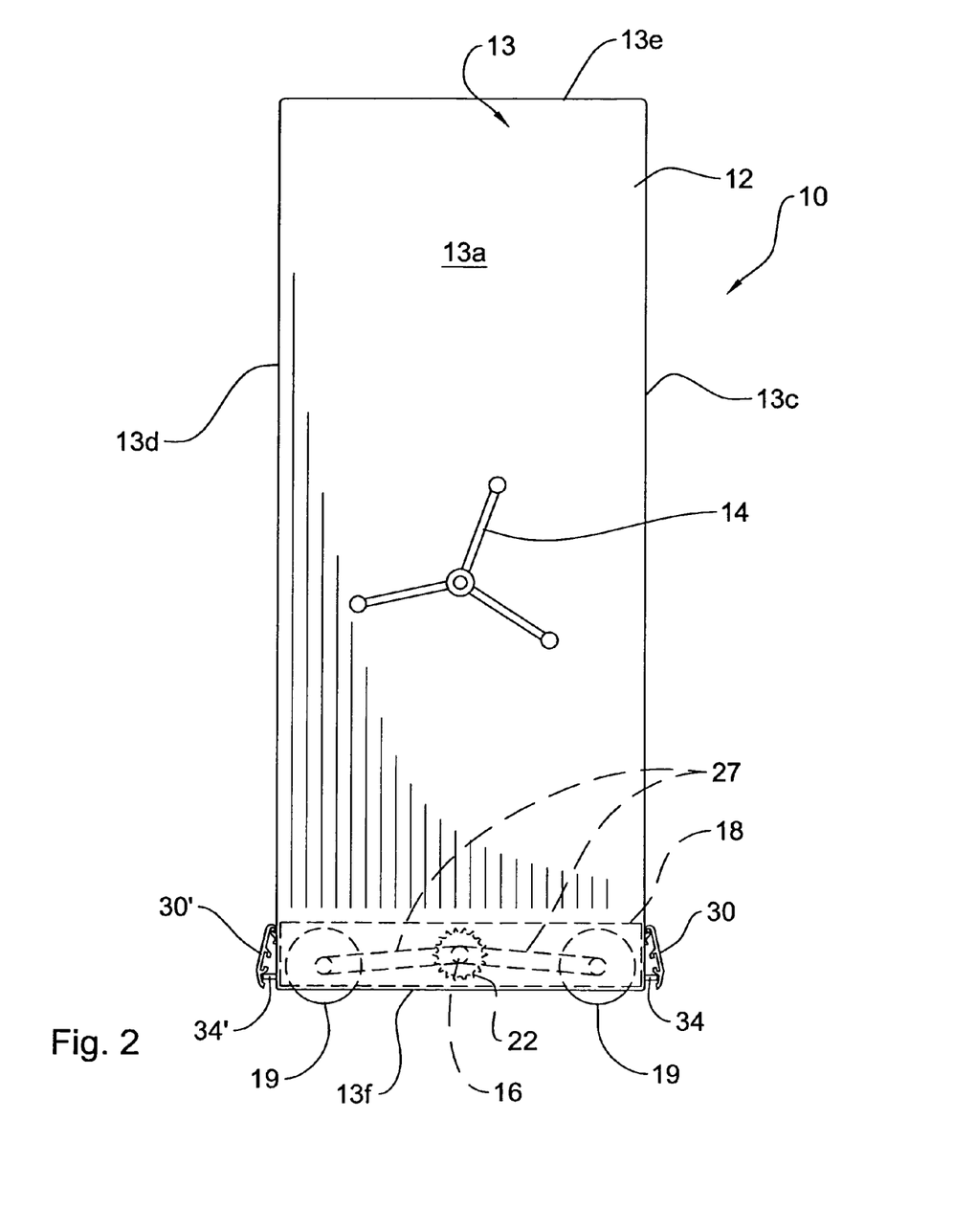
FIG. 2 is a side elevation of the mobile storage unit of FIG. 1 at an enlarged scale.

FIGS. 1-2 show a mobile storage system 10 comprising a number of mobile storage units 12 (only one storage unit 10 is shown in the drawings) defining a bodywork 13 having two end walls 13a, 13b, two side walls 13c, 13d, a top wall 13e and an undersurface 13f. Side walls 13c, 13d are provided with open-ended shelves 13g that can be accessed from either side wall 13c, 13d of storage unit 12. The illustrated storage unit 12 is a shelf, but could be any other sort of storage implement. Storage unit 12 rollably rests on the ground, is mounted to a number of floor-embedded guiding tracks T, and can be moved longitudinally therealong by rotating a three-pronged handle 14 located on a transversal end wall 13a of the storage unit bodywork 13. Rotation of handle 14 in a first direction will move storage unit 12 in a first longitudinal direction, and rotation thereof in the opposite direction will move storage unit 12 in an opposite second longitudinal direction. Handle 14 is operatively connected, directly or indirectly, for example through a mechanical connection—e.g. through the instrumentality of a known assembly of sprockets and chains (not shown)—to a shaft 16 (see FIG. 3-5B). Rotation of handle 14 in a first handle direction engenders rotation of shaft 16 in a first shaft direction, and rotation of handle 14 in a second handle direction engenders rotation of shaft 16 in a second shaft direction.

Figure 3:
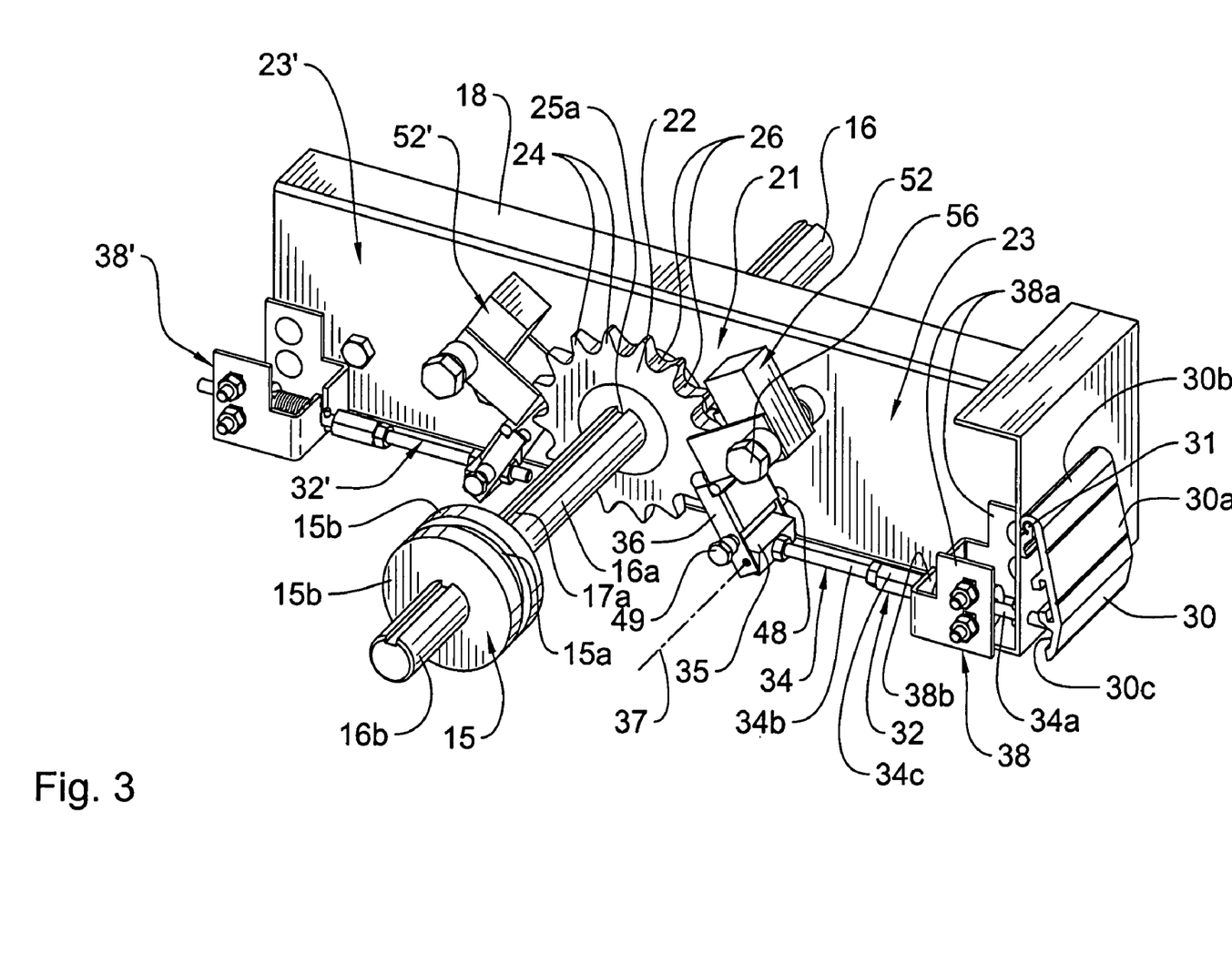
FIG. 3 is a front perspective view of the mobile storage unit braking system according to the present invention.

In the embodiment shown in FIG. 3, shaft 16 is not unitary but is rather composed of a number of discrete shaft portions—only two shaft portions 16a and 16b are shown in FIG. 3—which are connected coextensively by coupling members (only one coupling member 15 is shown connecting shaft portions 16a and 16b). Coupling member 15 is generally composed of a rubber disc 15a sandwiched between two metal discs 15b carried by the facing extremities of the shaft portions 16a and 16b. Coupling member 15 acts a torsion absorber, and will come under a great deal of torsional stress during braking of the storage unit, as described hereinafter.

As shown in FIGS. 2-5B, shaft 16 forms part of a driving mechanism of the storage unit 12, whose function is to longitudinally move the storage unit 12 along tracks T. The driving mechanism is mounted to a frame 18 suitably affixed to and part of the storage unit's main structure, and whose location relative to storage unit 12 is illustrated in dotted lines in FIG. 2. More particularly, frame 18 extends transversely between the two side walls 13c, 13d of storage unit 12. The driving mechanism comprises a number of track-engageable driving wheels 19 (only shown in FIG. 2) engaged in tracks T, and which are mechanically connected to shaft 16 through gears and chains for example so as to rotate in synchronism therewith. "In synchronism" does not necessarily mean at the same speed. The driving wheels 19 can be mounted directly to shaft 16, or can alternately be mounted to an auxiliary shaft (not shown) operatively coupled to driving shaft 16 by a suitable arrangement of sprockets and chains schematically shown at 27 in FIG. 2 and enabling this auxiliary shaft to rotate in synchronism with driving shaft 16. Moreover, storage unit 12 can further be provided with a number of idle wheels (not shown) to further rollably support storage unit 12 on the floor.

Figure 4A:
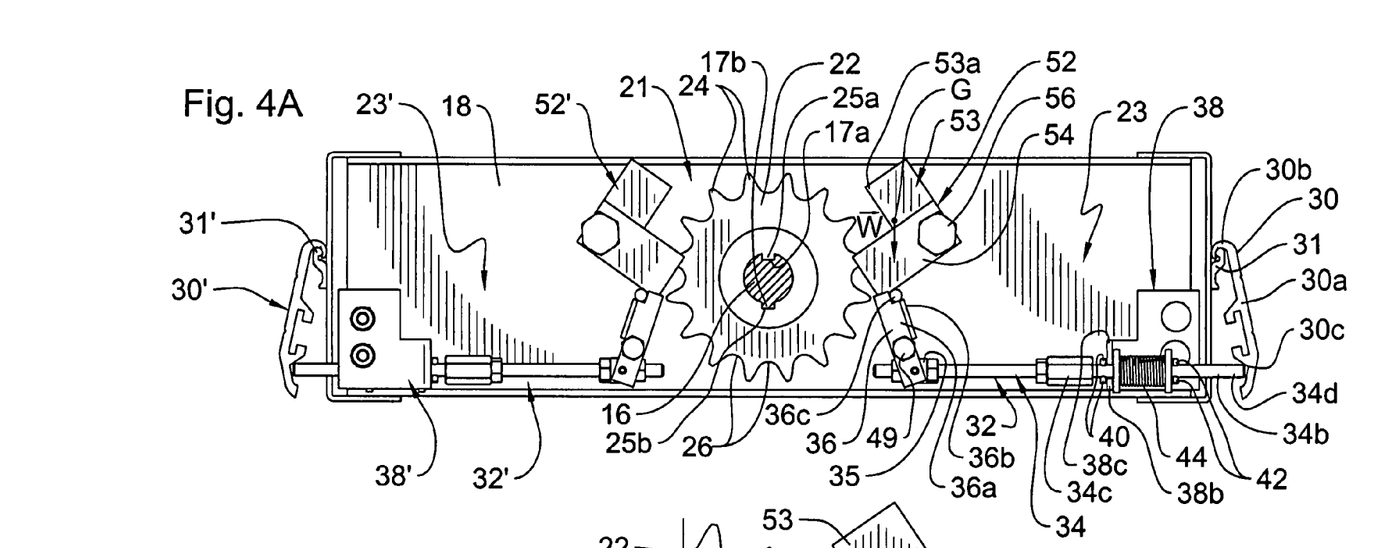
FIG. 4A is a front elevation of the braking system of FIG. 3, showing the braking block in its standby position.

The driving mechanism is provided with a braking system 21 to allow a person located in an aisle located between the side walls 13c, 13d of two storage units 12 that are in adjacent facing register to interrupt motion of either one of these storage units, to prevent closure of the aisle on the person for example. Braking system 21 is activated upon a person actuating a trigger means, i.e. by kicking an elongated floor-level kick plate 30, which runs lengthwisely alongside the outer bottom end portion of each side wall 13c, 13d of storage unit 12. As can be seen in FIG. 2, kick plates 30, 30' are provided on both sides of each storage unit 12, and the braking system 21 of a given storage unit 12 can be triggered from either side thereof. FIGS. 2-5B show that each kick plate 30, 30', for example kick plate 30, has a longitudinally constant crosssection that defines a main body portion 30a, and a curved upper lip portion 30b snugly yet pivotally engaging a support ridge 31 running lengthwisely alongside the outer bottom end portion of the storage unit side wall 13c. The distal end 34b of an outwardly spring-biased connecting rod 34, which will be described in further detail below, engages a channel portion 30c of kick plate 30 located opposite lip portion 30b and biases the kick plate's lower edge away from storage unit 12, so as to position kick plate 30 in an inclined rest position (FIG. 4A). In order to activate braking system 21 and brake a moving storage unit 12, the person must hit kick-plate 30 with his foot for example, so as to swing it in a braking position (FIG. 5A-5B) in which kick plate 30 is forced to pivot towards the storage unit side wall 13c until the kick plate lower edge becomes adjacent to side wall 13c.

As best shown in FIGS. 3-5B, braking system 21 comprises a first braking member carried by shaft 16 and having a number of first interlock means therearound. This first braking member, in the illustrated embodiment, is a toothed wheel 22 having a number of regularly and peripherally spaced apart teeth 24, with a gap 26 formed between each two consecutive teeth 24, 24. Toothed wheel 22 defines a central opening penetrated by shaft 16, and a defines a rigid projection 25a projecting towards the center of its central opening which fits snugly in a longitudinal groove 17a made radially inwardly in shaft 16. Similarly, a rigid projection 17b projecting radially from shaft 16 diametrically opposite groove 17a, mates with a registering indentation 25b made in toothed wheel 22 and extending from its central opening towards its peripheral teeth 24. Both these interlocking engagements ensure that toothed wheel 22 rotate as one with shaft 16.

Braking system 21 further comprises two braking assemblies 23, 23' located on either side of toothed wheel 22 and shaft 16. Braking assemblies 23 and 23' are identical and symmetrically arranged on either side of toothed wheel 22, and a detailed description of one will suffice for both. The components of braking assembly 23 are exhaustively numbered in the figures, whereas the components of the opposite braking assembly 23' are only selectively numbered for clarity of the views; these selectively numbered components bear the same reference number than their symmetrical counterpart in braking assembly 23 but have a prime (') suffixed thereto.

Braking assembly 23 comprises a linkage assembly 32 comprising the above-mentioned connecting rod 34 pivotally interconnected with a retaining member 36. Connecting rod 34 defines an inner rod portion 34a coextensively connected to an outer rod portion 34b through the instrumentality of an elongated nut 34c, with the facing ends of rod portions 34a and 34b being threaded and screwed in opposite sides of an elongated nut 34c. Nut 34c can be selectively rotated to increase of decrease the length of connecting rod 34, in order to calibrate the braking system as described hereinafter. Moreover, connecting rod 34 defines a distal end 34d at the outer end of outer rod portion 34b, which engages channel portion 30c formed on the inner surface of kick plate 30. Connecting rod 34 also defines a proximal end at the inner end of inner rod portion 34a, which fixedly carries an elongated connecting block 35. Connecting block 35 is in turn pivotally connected to retaining member 36 and can pivot relative thereto about a pivot axis 37 (FIG. 3).

Figure 6:
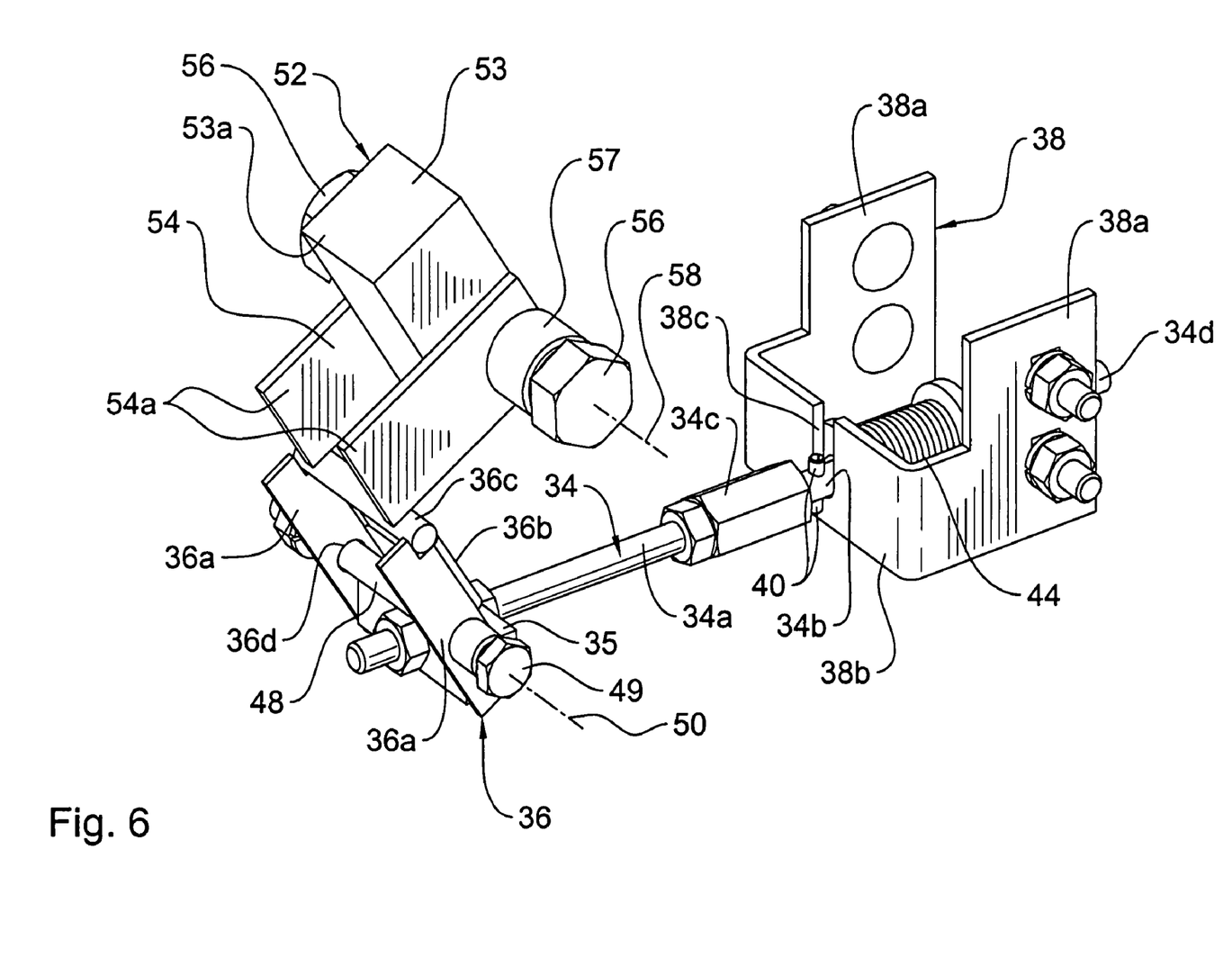
FIG. 6 shows in isolation a perspective view of one linkage assembly and associated braking block.

Connecting rod 34 is slidably supported by a U-shaped bracket member 38, as best seen in FIG. 6. Bracket member 38 defines two parallel L-shaped tabs 38a, 38a linked by a transverse wall 38b. Connecting rod 34, and more particularly its outer portion 34b, is slidably received in a notch 38c made in transverse wall 38b and extending downwardly from its upper edge.

One of tabs 38a is shown in FIG. 3-5B as being bolted to main frame 18. When installed in storage unit 12, the other tab 38a is also suitably bolted to an element of the storage unit's structure, although this is not shown in the drawings, for proper support of connecting rod 34.

Connecting rod 34 is provided with two pairs of abutment pins 40 and 42 transversal to the longitudinal direction of connecting rod 34. With respect to the views of FIGS. 4A-5B, abutment pins 40 are located on the left hand side of bracket transverse wall 38b. Abutment pins 42 are located on the right hand side of transverse wall 38b, and a coil spring member 44 axially penetrated by connecting rod 34 is located between abutment pins 42 and transverse wall 38b. Spring member 44 abuts against the abutment pins 42 on one side, and on transverse wall 38b on the other side; spring member 44 is continuously compressed, and continuously biases connecting rod 34 outwardly of the storage unit 12 so as to bias kick plate 30 towards its rest position.

As mentioned above, connecting block 35 at the proximal end of connecting rod 34 is pivotally interconnected with the lower end of a retaining member 36. More particularly, connecting block 35 is pivotally connected to and extends between two flat and parallel side flanges 36a, 36a of retaining member 36, as best seen in FIG. 6. Retaining member 36 also comprises a transverse bridge wall 36b extending perpendicularly between side flanges 36a, 36a. Bridge wall 36b is located spacedly above the bottom end of flanges 36a, 36a so as to clear connecting block 35, and is spaced from the top end of flanges 36a, 36a to make room for an abutment rod 36c. Abutment rod 36c is positioned at the top edge of bridge wall 36b, and is fixedly lodged within and extends between registering recesses made in the top end portion of side flanges 36a, 36a.

Retaining member 36 is pivotally mounted to main frame 18 by a pivot pin 48 which penetrates holes 36d made in side flanges 36a, 36a (only one hole 36d is visible in FIG. 6), and a nut 49 is fitted at the distal end of pivot pin 48 to prevent retaining member 36 from accidentally disengaging pivot pin 48. This pivotal mount enables retaining member 36 to pivot about a pivot axis 50.

A second braking member in the form of an L-shaped braking block 52 is pivotally carried by main frame 18 above retaining member 36. Braking block 52 comprises two portions: a solid parallelepiped pawl portion 53, and a lever portion 54 connected perpendicularly to pawl portion 53. Lever portion 54 is composed of thin, planar and parallel spaced-apart side walls 54a, 54a, linked by a pivot pin (concealed in the drawings). It is noted that the distance between the outer surfaces of side walls 54a, 54a, of braking block 52 is smaller than the distance between the inner surfaces of retaining member side flanges 36a, 36a. This relative dimensioning allows the lever portion 54 of braking block 52 to be admitted between retaining member flanges 36a, 36a in most if not all possible positions of braking block 52 as illustrated in FIG. 4A-5B. Also, abutment rod 36c is longer than the distance between the lever member side walls 54a, 54a to allow abutment of rod 36c against side walls 54a, 54a in some relative positions of braking block 52 and cam member 36.

Similarly to retaining member 36, braking block 52 is penetrated by the above-mentioned pivot pin which pivotally mounts it to main frame 18 and to which is affixed a pair of nuts 56 and washers 57 to prevent braking block 52 to accidentally disengage its pivot pin. This mounting of braking block 52 to main frame 18 positions block 52 right above retaining member 36, and permits pivoting of braking block 52 about a pivot axis 58.

Figure 4B:
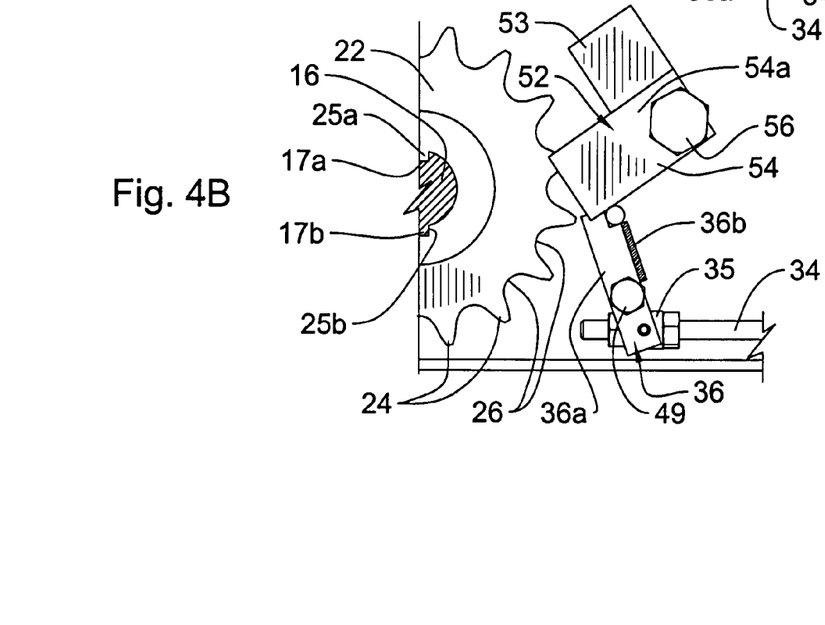
FIG. 4B is a front elevation at an enlarged scale of the braking system of FIG. 4A, focusing on the toothed wheel and one of the L-shaped braking blocks of the braking system.

When no pressure is being exerted on kick plate 30, spring member 44, which abuts at one end against bracket transverse wall 38b and at the other end against abutment pins 42, urges connecting rod 34 outwardly of storage unit 12 until abutment pins 40 abut against bracket transverse wall 38b, and connecting rod distal end 34d pushes kick plate 30 in its rest position (FIG. 4A-4B). In this extracted position of connecting rod 34, abutment member 36 is forced by spring 44 to engage, with abutment rod 36c, the braking block lever portion 54 as shown in FIG. 4A-4B, to maintain braking block 52 in its rest position in which pawl portion 53 is spaced from toothed wheel 22. Spring 44 acting on linkage assembly 32 thus counteracts the effect of gravity that continuously biases pawl portion 53 towards toothed wheel 22 due to the position of the centroid G of braking block 52 (see FIG. 4A). Indeed, centroid G is horizontally offset relative to pivot axis 58, and a gravity-borne weight force $\overline{W}$ generates a force moment continuously biasing braking block 52 towards toothed wheel 22 and towards its braking position.

When a person wants to move a storage unit 12, he rotates the three-pronged handle 14 in a given direction, which causes shaft 16 to move in a corresponding direction, and which in turn engenders rotation of driving wheels 19 engaged in tracks T to displace the storage unit 12 therealong. In many cases, storage unit 12 can also be pushed, in which case driving wheels 19 will freely roll along ground tracks T; in any event, the rotation of wheels 19 occurs in synchronism with that of shaft 16.

If a person standing within an aisle formed between two adjacent storage units 12 wants to interrupt the motion of one of them, for example because it is moving dangerously towards him, the person can kick or otherwise push the kick plate 30 to activate the braking system. More particularly, when a person hits kick plate 30, kick plate 30 is swung towards storage unit 12 in its braking position, as sequentially illustrated in FIG. 4A-5B. As kick plate swings towards its braking position, connecting rod 34 retracts within the storage unit against the bias of spring member 44 and pushes the lower end of retaining member 36 towards the toothed wheel 22, which causes retaining member 36 to pivot in this clockwise direction with respect to the views of FIGS. 4A-5B. As retaining member 36 is pivoted in a clockwise direction, abutment rod 36c is moved progressively away from toothed wheel 22 and abutment rod 36c progressively releases its restraining action on block member 52 to permit the latter to pivot under the bias of its own weight, with pawl portion 53 thus moving towards and then engaging toothed wheel 22, to prevent its rotation. Indeed, pawl portion 53 and its supporting pivot pin are then all substantially aligned with wheel 22 at the point of contact of pawl portion 53 with wheel 22.

Thus, when kick plate 30 is swung into its braking position, block member 52 can pivot towards toothed wheel 22, and the free outer corner 53a of braking block pawl portion 53 can engage the gap 26 formed between two successive teeth 24, and with tooth 24 located above corner 53a abutting and blocking against pawl portion 53.

Figure 5A:
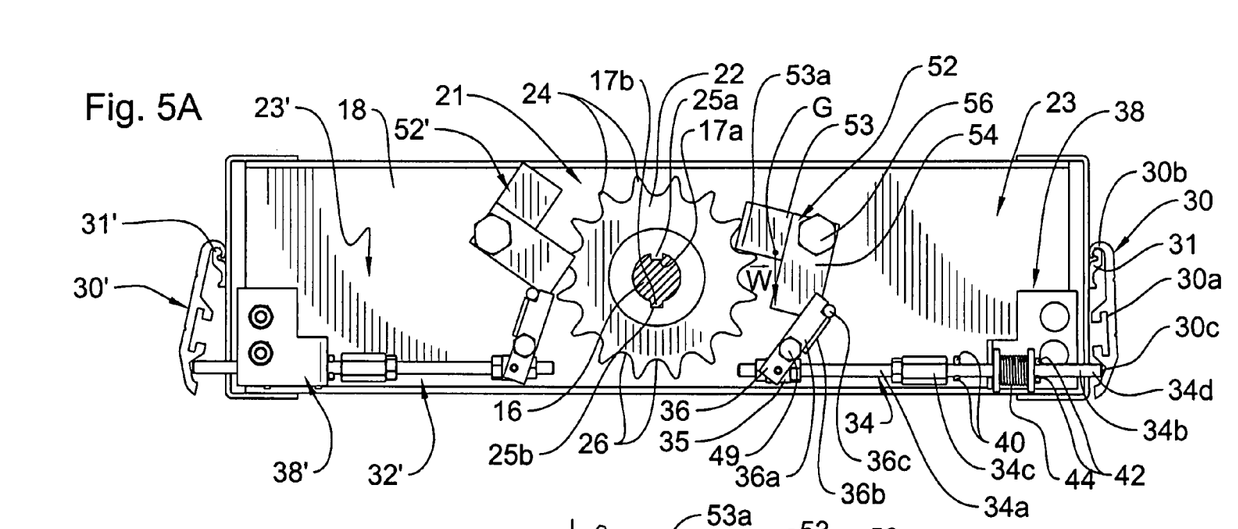
FIGS. 5A-5B are views similar to FIGS. 4A-4B respectively, but show the braking block in its braking position.
Figure 5B:
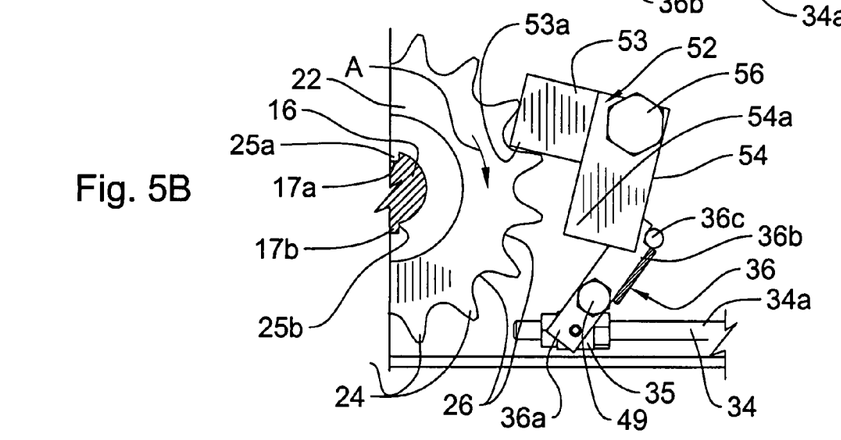

As shown in FIGS. 5A-5B, in the braking position of braking block 52, the latter is entirely released by retaining member 36. More particularly, it can be seen that a gap then exists between braking block lever portion 54 and retaining member abutment rod 36c. This prevents any stresses induced in braking block 52 by toothed wheel 22 during the braking operation from being transmitted to linkage assembly 32. It is noted that in an alternate embodiment, braking block lever portion 54 could freely abut against retaining member abutment rod 36c in the braking position of braking block 52, as long as no structural link connects the two. Indeed, this free abutment should not transmit any significant stress to linkage assembly 32 as retaining member 36 remains free to move relative to braking block 52 against the relatively weak bias of spring member 44.

It is noted that in the embodiment shown in the drawings, the gravity-borne interlocking engagement of braking block pawl portion 53 into toothed wheel 22 can only block toothed wheel 22 from rotating in one rotational direction, i.e. the direction indicated by arrow A in FIG. 5B. Indeed, if toothed wheel 22 rotates in the direction opposite arrow A and braking block pawl portion 53 is brought in gravity-borne engagement on toothed wheel 22, toothed wheel teeth 24 will serially slide against braking block corner 53a, thereby lifting and pivoting braking block 52 away from toothed wheel 22, without any interlocking engagement of corner 53a of braking block pawl portion 53 in the peripheral gaps 26 of toothed wheel 22.

To interrupt rotation of toothed wheel 22 in the direction opposite that indicated by arrow A, kick plate 30' located on the other side of storage unit 12 can be pushed in order to bring the braking block 52'—located opposite braking block 52 with respect to toothed wheel 22—in gravity-borne interlocking engagement with toothed wheel 22.

This unidirectional braking action, in practice, translates into the possibility for a person located within an aisle to interrupt the motion of a storage unit 12 solely when it moves towards him, and into his inability to interrupt the motion of a storage unit which moves away from him.

Moreover, shaft 16, as described above, is in one embodiment divided into a plurality of alternating shaft portions 16a, 16b coupled coextensively by torsion-absorbing coupling members 15. On one hand, each toothed wheel 22 is mounted to shaft portion 16a as shown in FIG. 3. On the other hand, the driving wheels 19, which draw the mechanical energy necessary to actuate the storage unit 12 along tracks T from shaft 16 or in any event that at least roll along tracks T, are operatively coupled to shaft portions 16b (this is not shown in the figures) through suitable gear assemblies and endless chains, which are distinct from shaft portions 16a.

When a person hits the appropriate kick plate 30, 30' to brake a storage unit 12 moving towards him, the corresponding braking block 52, 52' will be released by its retaining member 36 and will pivot under the bias of its own weight towards toothed wheel 22 and become interlocked therewith. Toothed wheel 22, and thus shaft portion 16a to which it is fixedly coupled, will then come to an abrupt stop, but the storage unit 12 will still have a considerable amount of kinetic energy to dissipate before being in turn immobilized. Thus, the driving wheels 19 will continue to rotate very slightly even after the braking system is activated due to this accumulated momentum in the heavy storage unit 12, and will therefore transmit rotational energy to shaft portion 16b, to which they are mechanically coupled. Consequently, since shaft portion 16a is completely prevented from moving because of its interlocking engagement by the corresponding braking block 52, 52', whereas concomitantly shaft portion 16b is slightly twisted by driving wheels 19, an important torsion force will be generated in shaft 16 at the interconnection of shaft portions 16a and 16b. This explains the presence of a torsion-absorbing coupling member 15 at the interconnection of shaft portions 16a and 16b: it helps to quickly dissipate the kinetic energy accumulated by storage unit 12 to stop it from moving once the braking system is activated and toothed wheel 22 is immobilized.

One advantage of the present invention relies on the gravity-actuated braking member. Indeed, having a gravity-actuated braking block 52 minimizes the likelihood of a mechanical malfunction of the braking system. Prior art devices have been known to remain stuck, break, wear, or generally stop to work at some point because of a defective mechanical link between the braking block 52 and the linkage assembly 32. One reason for this frequent occurrence of malfunction in prior art devices having structural links between the braking block and the linkage assembly is that when the braking block engages the toothed wheel, a very important amount of energy is transmitted from the toothed wheel to the braking block, and consequently very important stresses are exerted on the braking block and on any other structure directly mechanically linked thereto. With the braking system of the present invention, the absence of such a structural mechanical link between the braking block and the linkage assembly in the braking position of braking block 52 prevents the transmission of stresses to linkage assembly 32 and of failure thereof especially as a result of fatigue.

To calibrate the braking system, elongated nut 34c interconnecting rod portions 34a and 34b can be rotated, which causes the overall length of connecting rod 34 to be increased or decreased and the relative position of retaining member 36 and braking block 52 to be adjusted.

It is understood that alternate embodiments of the present invention could be envisioned without departing from the scope of the appended claims.

In an alternate embodiment, instead of the corner 53a of braking block pawl portion 53 interlocking with toothed wheel 22, a more complex interlock member defining a concavity sized to be snugly engageable around toothed wheel teeth 24 could be used. As per this embodiment, when the braking block is caused to fall on toothed wheel 22, its concavity-provided interlock member can snugly engage a tooth of toothed wheel on both sides, and thus block rotation of toothed wheel 22 in both directions, instead of merely preventing unidirectional rotation thereof as in the above-described embodiment.

In another alternate embodiment, the pawl member could be movable in translation towards the toothed wheel instead of being pivotally movable.

Generally, it is understood that the configuration of the braking members—i.e. toothed wheel 22 and braking block 52 in the above-described embodiment—could vary without departing from the scope of the present invention.

Moreover, the brake control means could be constructed differently than in the above-described embodiment. In the above embodiment, the brake control means is a linkage assembly comprising a kick plate, cooperating with a connecting rod, in turn cooperating with a retaining member, which in turn controls the movement of the braking block between its standby and braking positions. In an alternate embodiment, the brake control means could be any other suitably configured mechanical linkage accessible from the outside of the storage unit, and acting upon the braking block to displace it between its standby and braking positions. Alternately, the brake control means could be a selectively polarisable electromagnet connected to an electric control circuit. With this electric brake control means, the electromagnet could be polarised in its default state, to attract and bias the braking block towards its standby position. To brake the storage unit using such an electric brake control system, a person located within an aisle can activate an electric switch accessible from the outside of the storage unit to engender the depolarisation of the electromagnet. This would enables the braking block to fall under the influence of its own weight towards its braking position, and thus allow the braking block to come in gravity-borne interlocking engagement with the toothed wheel.

The invention claimed is:

1. A driving mechanism for use on a storage unit movable about a floor surface, said driving mechanism comprising:
    a frame;
    at least one driving wheel for engaging the floor surface, said driving wheel rotatably carried by said frame;
    a rotary first braking member rotatably carried by said frame and operatively connected to said driving wheel so as to rotate in synchronism therewith, said first braking rotary member defining at least one first interlock member;
    a gravity-biased second braking member defining at least one second interlock member and movably mounted to said frame so as to be movable between a standby position in which said second interlock member clears said first interlock member, and a braking position in which said second interlock member is interlocked with said first interlock member to block rotation of said rotary first braking member and thus of said driving wheel, said second braking member being biased under the action of gravity towards said braking position when it is in said standby position;
    a brake control member mounted to said frame, said brake control member movable between:
        a retaining position in which said brake control member engages and retains said second braking member in its said standby position against the bias of gravity, and
        a release position in which it releases said second braking member to allow gravity-borne movement of said second braking member towards said braking position;
    wherein said second braking member is free of any mechanical structural link with said brake control remember
    wherein said second braking member is pivotable relative to said frame about a pivot axis between said standby and braking positions, and defines a center of gravity horizontally offset relative to said pivot axis in said standby position;
    wherein said first braking member is mounted on a shaft rotatably mounted to said frame;
    wherein said first braking member is a toothed wheel mounted to said shaft and rotating as one therewith, said toothed wheel comprising a number of radially-oriented peripherally spaced-apart teeth, with a gap being formed between each two consecutive teeth, said teeth and said gaps forming said at least one first interlock member;
    wherein said second braking member is a braking block pivotally mounted to said frame adjacently to said toothed wheel, said braking block defining a free outer end forming said second interlock member, and wherein when said brake control member is moved to said release position, said braking block is forced towards said braking position under the action of gravity whereby said braking block free outer end comes into gravity-borne interlocking engagement in one of said gaps formed between two consecutive ones of said toothed wheel teeth wherein said braking block is L-shaped and is pivotally attached to said frame at an inner end located opposite said free outer end;
    wherein said brake control member is a linkage assembly carried by said frame and comprising a connecting rod defining a distal end destined to project outwardly of the storage unit, and a proximal end pivotally connected to a retaining member, said retaining member being in turn pivotally carried by said frame;

wherein said connecting rod can be axially moved between a first position and a second position relative to said frame, the axial movement of said connecting rod controlling the pivotal movement of said retaining member;

and wherein when said connecting rod is in said first position, said retaining member engages said braking block and retains it in said standby position against the action of gravity, and when said connecting rod is moved to said second position, said retaining member is pivoted away from and clears said braking block to allow gravity-borne interlocking engagement thereof with said toothed wheel.

2. The driving mechanism according to claim 1, wherein said driving mechanism further comprises a rotatable handle, said handle being operatively connected to said shaft for synchronised rotation therewith.

3. The driving mechanism according to claim 1, wherein said shaft comprises a number of shaft portions coextensively connected by torsion-absorbing coupling members.

4. The driving mechanism according to claim 1, wherein said linkage assembly further comprises a spring member continuously biasing said connecting rod towards said first position.

5. The driving mechanism according to claim 4, further comprising a floor-level kick plate pivotally mounted to said frame and resting freely against said connecting rod distal end.

6. A mobile storage unit movable about a floor surface, comprising:

a bodywork;

a driving mechanism for moving said storage unit about the floor surface, said driving mechanism comprising:

a frame mounted to said bodywork;

at least one driving wheel for engaging the floor surface, said driving wheel rotatably carried by said frame;

a rotary first braking member rotatably carried by said frame and operatively connected to said driving wheel so as to rotate in synchronism therewith, said rotary first braking member defining at least one first interlock member;

a gravity-biased second braking member defining at least one second interlock member and movably mounted to said frame so as to be movable between a standby position in which said second interlock member clears said first interlock member, and a braking position in which said second interlock member is interlocked with said first interlock member to block rotation of said rotary first braking member and thus of said driving wheel, said second braking member being biased under the action of gravity towards said braking position when it is in said standby position;

a brake control member mounted to said frame, said brake control member movable between:

a retaining position in which said brake control member engages and retains said second braking member in its said standby position against the bias of gravity, and a release position in which it releases said second braking member to allow gravity-borne movement of said second braking member towards said braking position;

wherein said second braking member is free of any mechanical structural link with said brake control member wherein said second braking member is pivotable relative to said frame about a pivot axis between said standby and braking positions, and defines a center of gravity horizontally offset relative to said pivot axis in said standby position;

wherein said first braking member is mounted on a shaft rotatably mounted to said frame;

wherein said first braking member is a tooted wheel mounted to said shaft and rotating as one therewith, said toothed wheel comprising a number of radially-oriented peripherally spaced-apart teeth, with a gap being formed between each two consecutive teeth, said teeth and said gaps forming said at least one first interlock member;

wherein said second braking member is a braking block pivotally mounted to said frame adjacently to said toothed wheel, said braking block defining a free outer end forming said second interlock member, and wherein when said brake control member is moved to said release position, said braking block is forced towards said braking position under the action of gravity whereby said braking block free outer end comes into gravity-borne interlocking engagement in one of said guns formed between two consecutive ones of said tooted wheel teeth;

wherein said brake control member is a linkage assembly carried by said frame and comprising a connecting rod defining a distal end destined to project outwardly of the storage unit bodywork and a proximal end pivotally connected to a retaining member, said retaining member being in turn pivotally carried by said frame;

wherein said connecting rod can be axially moved between a first position and a second position relative to said frame, the axial movement of said connecting rod controlling the pivotal movement of said retaining member;

and wherein when said connecting rod is in said first position, said retaining member engages said braking block and retains it in said standby position against the action of gravity, and when said connecting rod is moved to said second position, said retaining member is pivoted away from and clears said braking block to allow gravity-borne interlocking engagement thereof with said tooted wheel.

7. The driving mechanism according to claim 6, further comprising a rotatable handle operatively connected to said shaft for synchronised rotation therewith.

8. The driving mechanism according to claim 6, wherein said linkage assembly further comprises a spring member continuously biasing said connecting rod towards said first position.

9. The driving mechanism according to claim 8, further comprising a floor-level kick plate pivotally mounted to said frame and resting freely against said connecting rod distal end.

* * * * *